(No Model.)   2 Sheets—Sheet 1.
J. HOTHAM.
LIME DISTRIBUTER.
No. 365,519.   Patented June 28, 1887.
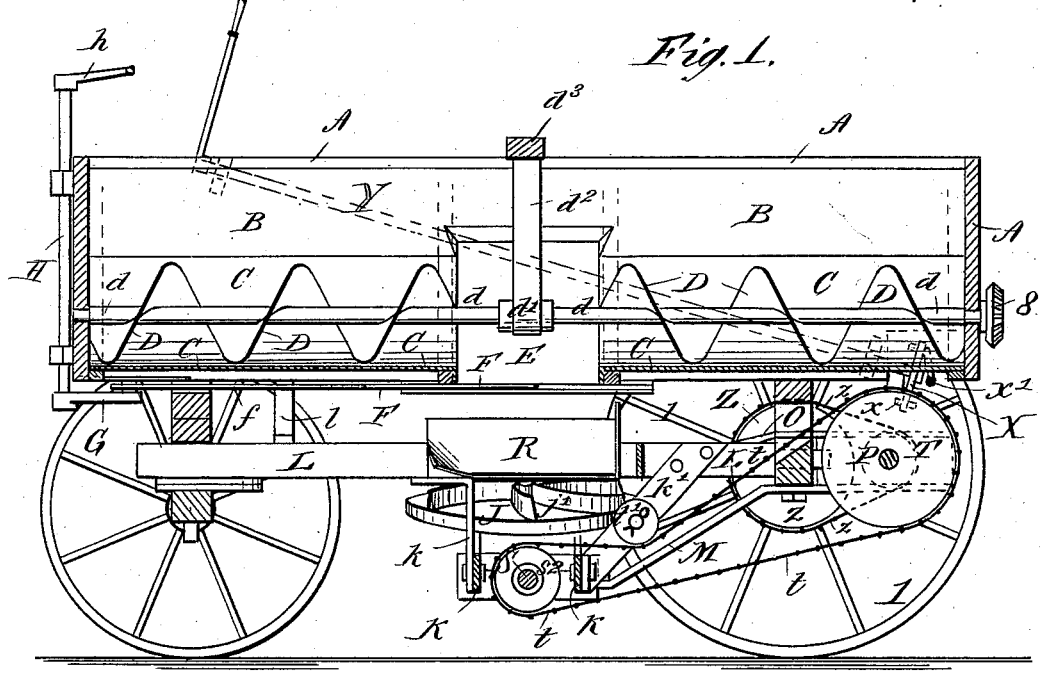
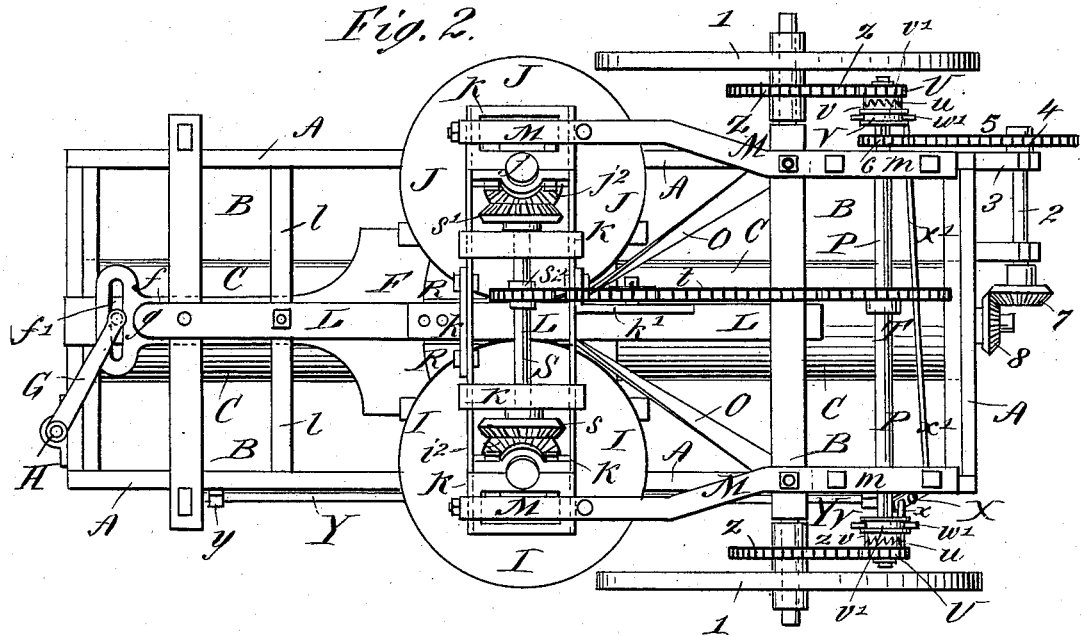
WITNESSES:
Donn Twitchell
C. Sedgwick
INVENTOR:
J. Hotham
BY Munn & Co.
ATTORNEYS.

(No Model.)

J. HOTHAM.
LIME DISTRIBUTER.

No. 365,519.  Patented June 28, 1887.

2 Sheets—Sheet 2.

WITNESSES:
Donn Twitchell
C. Sedgwick

INVENTOR:
J. Hotham
BY Munn & Co.
ATTORNEYS.

UNITED STATES PATENT OFFICE.

JOHN HOTHAM, OF HILLSIDE, PENNSYLVANIA.

LIME-DISTRIBUTER.

SPECIFICATION forming part of Letters Patent No. 365,519, dated June 28, 1887.

Application filed March 28, 1887. Serial No. 232,775. (No model.)

*To all whom it may concern:*

Be it known that I, JOHN HOTHAM, of Hillside, in the county of Westmoreland and State of Pennsylvania, have invented a new and Improved Lime-Distributer, of which the following is a full, clear, and exact description.

My invention relates to a machine for distributing lime or other fertilizer broadcast over plowed ground, and has for its object to provide a durable, effective, and easily-manageable machine of this character.

The invention consists in certain novel features of construction and combinations of parts of the lime-distributer, all as hereinafter described and claimed.

Reference is to be had to the accompanying drawings, forming a part of this specification, in which similar letters of reference indicate corresponding parts in all the figures.

Figure 3:
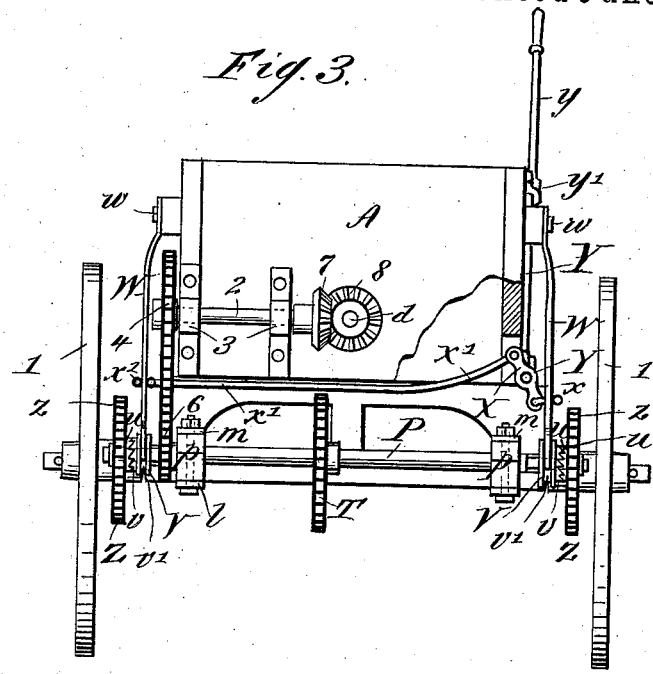

Figure 1 is a central longitudinal sectional elevation of my improved lime - distributer. Fig. 2 is an under side or bottom plan view of the machine with the forward truck-wheels removed. Fig. 3 is a rear end view of the machine, partly broken away and in section; and Fig. 4 is a central transverse sectional elevation of the machine.

The body or bed A of the lime distributer or spreader is supported on a suitable wheeled truck, and is made with oppositely-inclined side-boards B B, forming a hopper, down which the load of lime or fertilizer will pass by gravity to two troughs, C C, having rounded bottoms, and in which the right and left hand conveyer-screws D D rotate to carry the lime or fertilizer toward and into a central discharge-box, E, the bottom of which is open. A sliding valve or gate, F, fitted in suitable guides at the bottom of the box E, is connected by a rod or forward extension, $f$, having a slot, $f'$, through which passes a wrist-pin, $g$, on a crank, G, which is fixed to a vertically-ranging shaft, H, journaled at the front of the box A, and having a crank arm or lever, $h$, by which the attendant or driver may turn the shaft for opening the gate F more or less, to control the rapidity of discharge of the lime or fertilizer from the box onto the distributing devices, presently explained. The shafts $d\,d$ of the front and rear screw-conveyers D D are journaled at their outer ends in suitable bearings in the front and rear side walls of the box A, and the inner ends of the shafts are journaled in suitable bearings held by a strap, $d'$, to a pendent post or bar, $d^2$, which is fixed at its upper end to a cross-bar, $d^3$, which is bolted or otherwise secured to the sides of the bar A. This construction allows the conveyers to be readily removed at any time without taking the box A apart.

Figure 4:
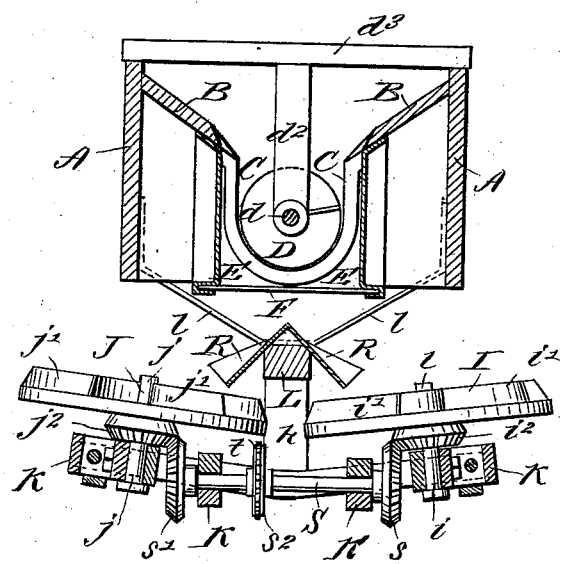

The two lime or fertilizer distributing wheels I J are fixed to shafts $i\,j$, respectively, which are journaled in suitable boxes in a frame, K, supported beneath the reach or tongue L of the machine-truck, one wheel being journaled at each side of the machine and both wheels being inclined from the horizontal, so as to be lowest at their inner adjacent parts and highest at their outer parts, as seen best in Fig. 4 of the drawings. The frame K is supported at its central part from the reach L by front and rear brackets, $k\,k'$, respectively, and at its opposite ends the frame is supported by heavy metal bars M M, which are bolted at their rear ends or parts to the hind axle, N, of the truck. The reach L is braced by iron stays or plates O O to the hind axle, and the brace-bars M O have rearward extensions, $m\,o$, between which the boxes $p\,p$ of the main driving-shaft P are bolted. The reach L is braced to the forward part and opposite sides of the body A by a bent bar, $l$, thereby staying the reach laterally in front of the distributing-wheels.

To the reach between the lime or fertilizer delivery box E and the distributing-wheels I J is fixed a double-inclined chute or apron, R, on which the lime falls from the box E, and from which the lime is directed in two evenly-divided portions upon the faces of the opposite wheels I J, which have curved radial blades $i'\,j'$, respectively, which catch the lime or fertilizer and scatter it broadcast to opposite sides of the machine over the ground, as the wheels are rotated in opposite directions by gearing next described. A shaft, S, journaled in the wheel-frame K, carries two bevel-pinions or gear-wheels, $s\,s'$, which mesh with like bevel-wheels, $i^2\,j^2$, fixed to the shafts of the wheels I J, respectively, and the shaft S also carries a chain-wheel, $s^2$, around or over which a chain, t, passes to a drive-wheel, T, which is fixed to the main driving-shaft P. On the opposite ends of the shaft P are fitted loosely chain-wheels U U, having half-clutches u u at their inner faces, and to the shaft are splined clutch-wheels V V, having half-clutches v v, adapted to engage the clutches u u of wheels U U.

To opposite sides of the box A a couple of shipper-bars, W W, are held loosely at their upper ends at w, and at their lower ends the bars have forks w', engaging annular grooves v' in the peripheries of the clutch-wheels V. A lever, X, fixed at its center to the back end of a shaft, Y, journaled in eyes or bearings y' y' on the box A, is connected at one end by a short link, x, with one of the shipper-bars W, and is connected at its other end by a rod, x', running across the box A to the other or opposite bar W, and whereby, as the shaft Y is turned in one direction by its handle y within reach of the driver or attendant, both the clutch-wheels V V will be moved outward on the shaft P and into engagement with the clutches u u on the chain-wheels U U, which wheels are connected by driving-chains z z with chain-wheels Z Z, fixed to the hubs of the hind wheels, l l, of the truck. With this construction and with the clutches u v engaged as above described, the shaft P will be rotated by the travel of the machine and will cause rotation, through the gearing T t s², of the shaft S, and thereby rapidly rotate the distributing-wheels I J, from which the lime or fertilizer will be spread broadcast over the ground in any desired quantity, accordingly as the gate or valve F of the box is opened more or less to regulate the supply to the wheels. When the shaft Y is turned the other way by shifting its handle y, the clutch-wheels V V will be disconnected from the chain-clutch wheels U U, and the shaft P and wheels I J then will remain at rest, as is necessary or desirable in traveling over roads to and from the field.

For operating the right and left hand conveyer-screws D D, I employ a shaft, 2, which is journaled in suitable bearings, 3, fixed to the back end-board of the box A, and the shaft 2 carries fixedly at its outer end a chain-wheel, 4, around and from which a chain, 5, passes to a chain-wheel, 6, fixed to the main driving-shaft P, and the inner end of the shaft 2 carries a bevel gear-wheel, 7, which meshes with a bevel gear-wheel, 8, fast to the shaft d of the rear conveyer D. With this construction the conveyers will be operated to carry the lime or fertilizer into the delivery-box E as the shaft P is rotated, and will remain at rest when said shaft is at rest. The conveyer may be made to run faster or slower by changing the chain-wheels 4 on the shaft 2 and readjusting the chain 5, which may be very quickly done.

It will be noticed that the two lime or fertilizer distributing wheels I J are not geared together by intermeshing peripheral teeth on them, but are rotated independently of each other; hence the wheels will not become clogged or choked up by the lime or fertilizer filling their gearing. Furthermore, as the lime falls from the box A or hopper onto the apex of the apron R it will be delivered in even quantity to each of the distributing-wheels, which will scatter it uniformly over the ground at each side of the machine.

The machine will evenly and widely distribute either fine or lumpy lime or other fertilizer, and will hold a large load of it, which may be increased by fitting an upper box on the box A when desired.

Having thus fully described my invention, what I claim as new, and desire to secure by Letters Patent, is—

1. The combination, in a lime-distributer, of a box or hopper and two independently-geared distributing-wheels journaled below the hopper and receiving the lime or fertilizer therefrom, and said wheels set higher at their outer than at their inner parts, substantially as hereinbefore set forth.

2. The combination, in a lime-distributer, of a box or hopper, two independently-geared distributing-wheels journaled below the hopper and set higher at their outer than at their inner parts, and a double-inclined apron located between the hopper and the distributing-wheels, substantially as herein set forth.

3. The combination, in a lime-distributer, of a box or hopper, A B, having a discharge-opening, E, a gate or valve, F, controlling said opening, right and left hand conveyers D D, carrying the lime or fertilizer to said opening, two independently-geared distributing-wheels, I J, journaled below the hopper, and a double-inclined apron, R, arranged between the hopper and distributing-wheels, substantially as described, for the purposes set forth.

4. The combination, in a lime-distributer, and with a box or hopper, A B, distributing-wheels I J, and gearing i² j² S s s' s² P T t, arranged to rotate the wheels I J, substantially as specified, of chain-wheels U, loose on the shaft P and having clutches u, clutch-wheels V v, splined to said shaft, chain-wheels Z on the truck-wheels, chains z, connecting the wheels U Z, shipper-rods W W, and a lever, X, pivoted on the box A, a link, x, and rod x', connecting the lever X with the opposite rods W W, and an operating-shaft, Y, to which the lever X is fixed, substantially as described, for the purposes set forth.

5. The combination, in a lime-distributer, and with a box or hopper, A B, and conveyers D thereon, of a gear-wheel, 8, on the conveyer-shaft, a shaft, 2, on the box and having a wheel, 7, meshing with wheel 8, a chain-wheel, 4, on shaft 2, a chain-wheel, 6, on a driving-shaft, P, operated from the truck-wheels, and a driving-chain, 5, connecting wheels 4 and 6, substantially as shown and described.

6. In a lime-distributer, the frame K, in which the distributing-wheels I J are journaled, supported from the truck reach-bar L by brackets $k\ k'$, a brace, $l$, fixed to the bar L and the box or hopper and bars M, and braces O, connecting the frame with the hind truck-axle, substantially as shown and described.

JOHN HOTHAM.

Witnesses:
ELI CHAMBERS,
D. L. CRANFORD.